US010719108B2

(12) United States Patent
Seitz

(10) Patent No.: US 10,719,108 B2
(45) Date of Patent: Jul. 21, 2020

(54) SENSOR AND METHOD OF HEATING A SENSOR

(71) Applicant: SICK AG, Waldkirch (DE)

(72) Inventor: Stefan Seitz, Waldkirch (DE)

(73) Assignee: SICK AG, Waldkirch (DE)

( * ) Notice: Subject to any disclaimer, the term of this patent is extended or adjusted under 35 U.S.C. 154(b) by 613 days.

(21) Appl. No.: 15/444,579

(22) Filed: Feb. 28, 2017

(65) Prior Publication Data

US 2017/0248997 A1 Aug. 31, 2017

(30) Foreign Application Priority Data

Feb. 29, 2016 (EP) .................................... 16157940

(51) Int. Cl.

| | |
|---|---|
| ***G06F 1/26*** | (2006.01) |
| ***H05B 1/02*** | (2006.01) |
| ***G06K 7/14*** | (2006.01) |
| ***G06K 7/10*** | (2006.01) |
| ***G01D 3/08*** | (2006.01) |

(52) U.S. Cl.

CPC ................. *G06F 1/26* (2013.01); *G01D 3/08* (2013.01); *G06K 7/10881* (2013.01); *G06K 7/1413* (2013.01); *H05B 1/023* (2013.01)

(58) Field of Classification Search

CPC .... G06K 7/10; G06K 7/10881; G06K 7/1413; G05F 1/66; G06F 1/26; G01D 3/08; H05B 1/023; H05B 1/00

USPC ................................ 219/209, 388, 412, 492

See application file for complete search history.

(56) References Cited

U.S. PATENT DOCUMENTS

| | | | | |
|---|---|---|---|---|
| 6,612,493 | B1 | 9/2003 | DeGiovine et al. | |
| 7,798,411 | B2 | 9/2010 | Gagne et al. | |
| 2004/0212861 | A1 | 10/2004 | Gagne et al. | |
| 2005/0173401 | A1 * | 8/2005 | Bakanowski ............ | A21B 1/00 219/412 |

FOREIGN PATENT DOCUMENTS

| | | | |
|---|---|---|---|
| CN | 103869844 | B | 11/2014 |
| DE | 199 33 518 | B4 | 2/2004 |
| DE | 10 2006 054 492 | B4 | 6/2010 |
| WO | 2006/037283 | A1 | 4/2006 |

OTHER PUBLICATIONS

European Search Report dated Aug. 4, 2016 issued in corresponding European Application No. 16157940.4.

* cited by examiner

*Primary Examiner* — Phuong T Nguyen

(74) *Attorney, Agent, or Firm* — Nath, Goldberg & Meyer; Jerald L. Meyer

(57) ABSTRACT

A sensor (10) is provided that has at least one sensor functional group (12), a heating device (14, 22), and a heating control (14, 20) to control a heating power ($P_{heating}$) of the heating device (14, 22). In this respect, the heating control (20) is configured to adapt the heating power ($P_{heating}$) to a power consumption ($P_{sensor}$) of the sensor functional group (12).

17 Claims, 4 Drawing Sheets

$U_{total}$
28
30
10
26
24
Sensor function
12
$P_{heating}$
Heating element
22
14
$Sensor_{on/off}$
Variable for $P_{heating}$
20
Heating control
$P_{sensor\_actual}$
$P_{total\_actual}$
$I_{sensor}$
$U_{total}$
$I_{total}$
$T_{sensor}$
32

SENSOR AND METHOD OF HEATING A SENSOR

FIELD

The invention relates to a sensor, in particular to an optoelectronic sensor, as well as to a method of heating a sensor in accordance with the preambles of claims 1 and 15 respectively.

BACKGROUND

The operation of sensors is frequently not easily possible at low temperatures, above all when the environmental temperature drops considerably below freezing point. There is a risk that not all electronic and electromechanical elements used are suitable or licensed for use at low temperatures. In particular optoelectronic sensors are sensitive to fogging at the optical elements, such as lenses or a front screen that may even ice over.

A known solution is the heating of the total device or of its critical components by a heating. The power output of a conventional heating assembly is, however, hardly variable. The accessing of the largely constant heating power practically takes place digitally by a cyclic switching on and off. The desired internal temperature arises by thermal inertia and energetic averaging and the objective is thus reached from a thermal viewpoint.

However, this process demonstrates disadvantages from an electrical viewpoint. The power pick-up differs greatly due to the change of phases having high and low power demands. A lot more than the average power requirement is demanded in the heating phases. The feeding power supply assembly has to be able also to provide the demanded peak powers. This can as a rule only be achieved by a corresponding overdimensioning. The same applies to the required lines, plug connectors and power protection elements within the supply circuit.

DE 199 33 518 B4 discloses a barcode reading device having a heating element whose heat is distributed by the air circulation that a rotating polygon mirror wheel generates. The control of the heating is not discussed.

A barcode reading device is likewise heated in DE 10 2006 054 492 B4, wherein here a heat conductivity body is formed as a reception console for holding the optical or electronic component. In an embodiment, a plurality of heating elements are provided that can be switched centrally by means of a control and regulation unit.

U.S. Pat. No. 6,612,493 discloses a further optical scanner having a heating module that is thermostatically controlled. It is thereby heated as soon as the air temperature drops below a specific value.

U.S. Pat. No. 7,798,411 B2 deals with a front screen for an optical scanner that avoids fogging by means of a PCT (positive temperature coefficient) heating wire. The particular temperature characteristic of the heating wire provides a self-regulation that protects against overheating.

SUMMARY

It is therefore the object of the invention to improve the heating of a sensor.

This object is satisfied by a sensor and by a method of heating a sensor such as an optoelectronic sensor, or an optoelectronic sensor used in a code reader. The sensor has at least one sensor functional group. Any desired electrically active components of the sensor are covered by this term that vary greatly in dependence on the construction of said sensor. The sensor can have additional elements, which is also the case as a rule, such as lenses, holders or housings. Such elements possibly also have a specified heat work range, but do not themselves take up any electrical power and accordingly also do not generate any waste heat. In addition, the sensor has a heating device having a heating control in order also to bring the sensor to a temperature range in a cold environment and to hold it there, the functionality being ensured in said temperature range.

The invention now starts from the basic idea of taking account of the power consumption of the sensor functional group in the dimensioning and/or control of the heating device and in particular to adapt the heating power accordingly.

The invention has the advantage that a substantially more uniform electrical power consumption of the sensor is achieved. In the ideal case, fluctuations of the electrical power consumption are completely equalized. The power demands on the power supply of the sensor are considerably reduced such that its power pack can be given smaller dimensions or can supply further sensors. A higher network stability is achieved by the disappearance or at least the great reduction of power peaks in the sensor supply without voltage drops and voltage peaks and overall with less impairment of adjacent consumers within the power circuit and also a higher operating safety is achieved. Smaller demands on the installation technology also result with reduced safeguarding values and conductor cross-sections, less copper consumptions, greater wiring flexibility with the possibility of longer wiring paths between the power supply and the sensor and with a simplified device connection technology to the sensor. Since temperature fluctuations in the interior of the sensor are reduced, the latter's reliability is increased due to fewer thermal expansion effects and less thermal stress at elements and solder points.

The heating control is preferably configured to keep the sum of heating power and power consumption constant. This will not succeed absolutely exactly in practice; tolerances are therefore possible. The heating device then adds just that heat that does not anyway arise as waste heat of the sensor functional group. This provides a particularly uniform power consumption of the sensor as a whole and provides a particularly uniform heating. Keeping the sum of heating current and sensor current constant is particularly preferred. The currents determine the power under the requirement of the same supply voltages. They can be easily determined and controlled.

The sensor functional group preferably has at least one of the following components: a transmitter, a receiver, an analog circuit, a digital module, a motor. The specific components naturally depend on the type and construction of the sensor. Practically every sensor has a receiver for the sensor signal; a plurality of sensors additionally have a transmitter. A motor serves, for example, as a servomotor; in a scanner also as a rotating mirror or a polygon wheel mirror. Analog circuits can serve for the control, evaluation, preprocessing and supply, such as a laser driver or a high voltage supply of an APD. Digital modules such as microprocessors, FPGAs (field programmable gate arrays) or ASICs (application specific integrated circuits) frequently serve for the evaluation, but, for example, also for communication to the outside for the outputting of measured data or for parameterization.

The heating device preferably has a controllable electronic component as a heating element. Such an element is variable, small to build and easy to integrate into the sensor, for example a transistor or an ohmic resistor.

The heating control is preferably configured to heat at a high heating power in a starting phase and only then to switch the sensor functional group active. On being switched on, the sensor is possibly still too cold to be able to operate the sensor functional group. Only heating is therefore initially carried out, preferably at the maximum available heating power, to quickly reach an operating temperature of the sensor functional group. From this time onward, the sensor functional group that is connected as active itself contributes to the heating and the heating device can reduce the heating power accordingly.

The heating control is preferably configured to parameterize or to teach the power consumption. It is assumed in this respect that the power consumption of the sensor functional group remains regular in the course of operation. This power consumption is either determined in the design or is determined ex works or on site in a teaching process by test operation. It is usually modeled using a constant, but a course is also conceivable, for example when the sensor only cyclically measures actively and the sensor functional group therefore has an irregular, but more-or-less predictable power consumption.

The heating control is preferably configured to measure the power consumption. The actually current power consumption is thereby available. The time resolution is set, for example, by measurement cycles or are already fixed to a sensible value by design. The advantage of a measurement of the power consumption is that its time development becomes detectable much more exactly and is not only based on the assumption of similar routines such as during parameterization or teaching. The effort is in turn higher to be able to be measure the power consumption. Mixed forms are also conceivable. For example, a typical power consumption is parameterized and this information is used when the power measurement fails in order to bridge the cycles up to the next measurement, to validate the measurement and the like.

The heating device preferably has a current measurement unit for the current flowing in the sensor functional group in order thus to determine the power consumption. A current measurement can be implemented in a comparatively less complex manner. At the same time, the consumed current is as a rule the variable that fixes the power consumption in addition to the often constant and known applied input voltage.

The heating control is preferably configured only to determine the power consumption for some of the sensor functional group. It is again preferred that portion having the relatively largest power consumption or the largest fluctuations or that is thermally active the most is utilized. The non-measured portions can be taken into account, for example, by scaling up or by constants.

The sensor preferably has a temperature probe connected to the heating device. The heating device utilizes the measured temperature as a supplement and for validation with respect to the actually present temperatures, for instance to additionally adapt the heating power when a predefined temperature corridor is departed from. The temperature measurement is as a rule only an emergency measure since a correctly designed heating control anyway observes the temperature corridor and even observes it much more exactly. If, however, the environment deviates greatly from the specific conditions, for example, such an emergency measure can be helpful. The heating control can also know, for instance in the form of a calculation rule or a look-up table, which heating power is required at which measured temperature to return to the temperature corridor. This fact and the power consumption of the sensor functional group then allow a fast return feedback into the temperature corridor. The temperature probe can measure the temperature in the interior and/or the environmental temperature.

The heating device is preferably accommodated in its own housing that is coupled to a housing of the sensor functional group. A heating module is thus created that can be attached to the sensor from the outside. The modular concept facilitates the variant formation, the development, the retrofitting or refitting, the installation and the maintenance.

The heating device is preferably accommodated in a housing that surrounds a housing of the sensor functional group. In this alternative, the housing of the heating device is not only led to the sensor housing, but rather surrounds the total sensor. This facilitates keeping the sensor itself warm and likewise allows a modular concept with the high flexibility explained in the preceding paragraph.

The sensor preferably has at least one heat coupling element for the conducting onward of heat of the heating device and/or from thermally active sensor components to critical points of the sensor functional group. The heat is thus homogeneously distributed in the sensor or heat is directly conducted to where it is needed the most. Heat coupling elements can also improve the connection to a housing or between a plurality of housings when the heating device and/or the sensor functional group has its own housing.

The method in accordance with the invention can be further developed in a similar manner and shows similar advantages in so doing. Such advantageous features are described in an exemplary, but not exclusive, manner in the subordinate claims dependent on the independent claims.

BRIEF DESCRIPTION OF THE DRAWINGS

The invention will be explained in more detail in the following also with respect to further features and advantages by way of example with reference to embodiments and to the enclosed drawing. The Figures of the drawing show in.

DETAILED DESCRIPTION

Figure 1:
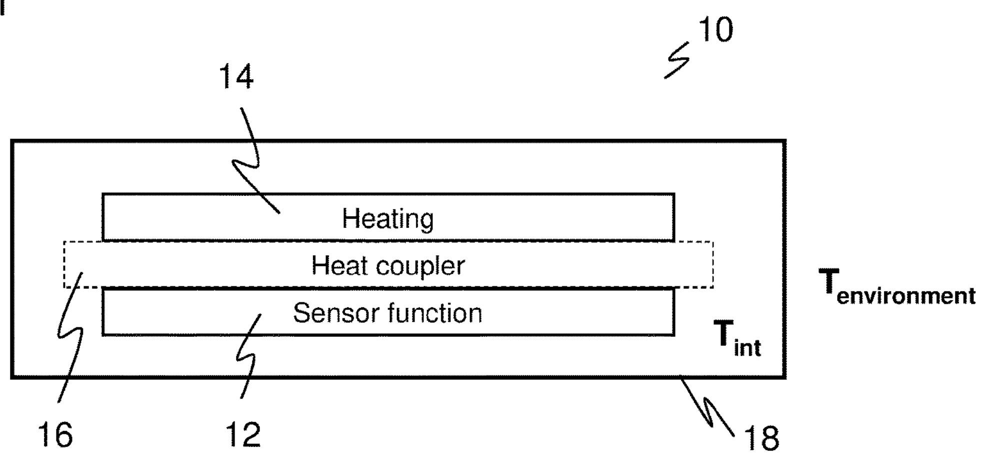
FIG. 1 a block diagram of a heatable sensor.

FIG. 1 shows a block diagram of a heatable sensor 10. The representation is extremely simplified and combines the various elements for the sensor operation in a sensor functional group 12. The senor 10 can use any known sensor principle such as inductive, magnetic, capacitive, based on radiated or guided radar, light or ultrasound. Since optical elements are particularly sensitive to fogging at low temperatures, the sensor 10 is preferably an optoelectronic sensor, in particular a barcode scanner. The specific elements and arrangements of the sensor functional group 12 will not be looked at in any more detail here and are assumed as known.

A heating assembly 14 is furthermore provided in the sensor 10 and its design will be explained in more detail below in connection with FIG. 3. The heating assembly 14 provides that sufficiently high temperatures $T_{int}$ are present in the sensor 10 and thus allow the operation of the sensor 10 at low environmental temperatures $T_{environment}$. A heat coupler 16 distributes the heat generated in the sensor 10 to the relative points. The sensor 10 is accommodated in a housing 18 that offers protection against the penetration of foreign bodies and that conversely provides protection for the user against dangers voltages or moving components. The housing 18 also serves at least to a certain extent for the maintenance of the temperature $T_{int}$ and can be additionally be configured as insulating for this purpose.

The sensor 10 is shown with only one sensor functional group 12. Further sensor functional groups can be provided that have their own heating assembly. It is, however, also conceivable that such further sensor functional groups are not cold-sensitive or are co-heated.

Figure 2:
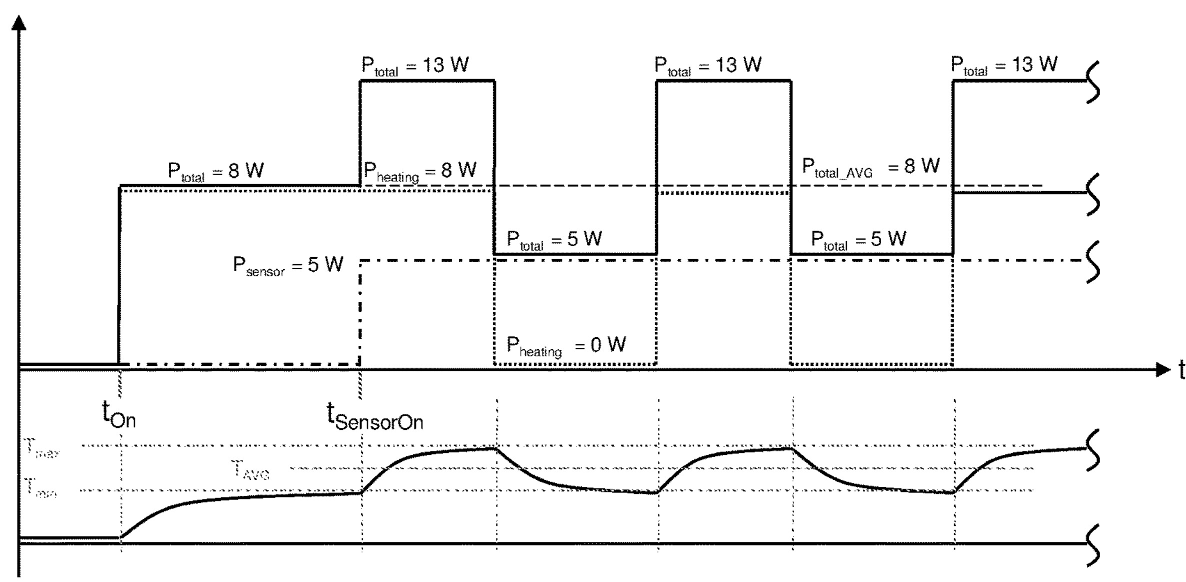
FIG. 2 a time-dependent power observation with a conventional heating control.

FIG. 2 shows a time-dependent power observation with a conventional heating control to illustrate its electrical operating behavior. In the upper part, the total power $P_{total}$ is shown by a solid line; the pure heating power $P_{heating}$ of the heating assembly 14 by a dotted line; the power consumption $P_{sensor}$ of the sensor functional group 12 by a chain-dotted line; and the mean power $P_{total\_AVG}$ by a dashed line. The lower part represents the temperature development of the temperature $T_{int}$ in the sensor 10.

In this example, a heating power of $P_{total\_AVG}$=8 W is required for the operation of the sensor 10 at $T_{environment}$=35° C. It is assumed that the sensor functional group 12 remains switched off at low temperatures so that the total heating power $P_{total}$ has to be applied via $P_{heating}$ on the switching on of the sensor. This status is maintained for so long until all the relevant internal sensor elements and components have reached the same minimum temperature. The electronics of the sensor functional group 12 can be released from then onward. The power loss $P_{sensor}$ of 5 W in this example hereby generated likewise makes an energetic contribution to the heating of the total device from this point in time onward.

Since the conventional heating assembly still continues to heat at an unchanged power $P_{heating}$=8 W, the sensor 10 consumes a $P_{total}$=13 W in this operating phase and converts it into heat. This produces unnecessarily high temperatures in the sensor interior so that, on reaching a maximum upper temperature threshold, the heating assembly 14 with the delivered thermal power $P_{heating}$ is completely switched off. The heating power now applied only over $P_{sensor}$=5 W is no longer sufficient to cover the heating requirement of the sensor 10. This in turn has the result on or shortly before a reaching of a minimum temperature of a switching back on of the complete heating power $P_{heating}$=8 W. These two states then alternate in the further course. To apply an average heating power of $P_{total\_AVG}$=8 W, a supply for the peak of $P_{heating}$+$P_{sensor}$=13 W therefore has to be stored that is overdimensioned in principle. In addition, the temperature development is subject to unnecessary fluctuations.

Figure 3:
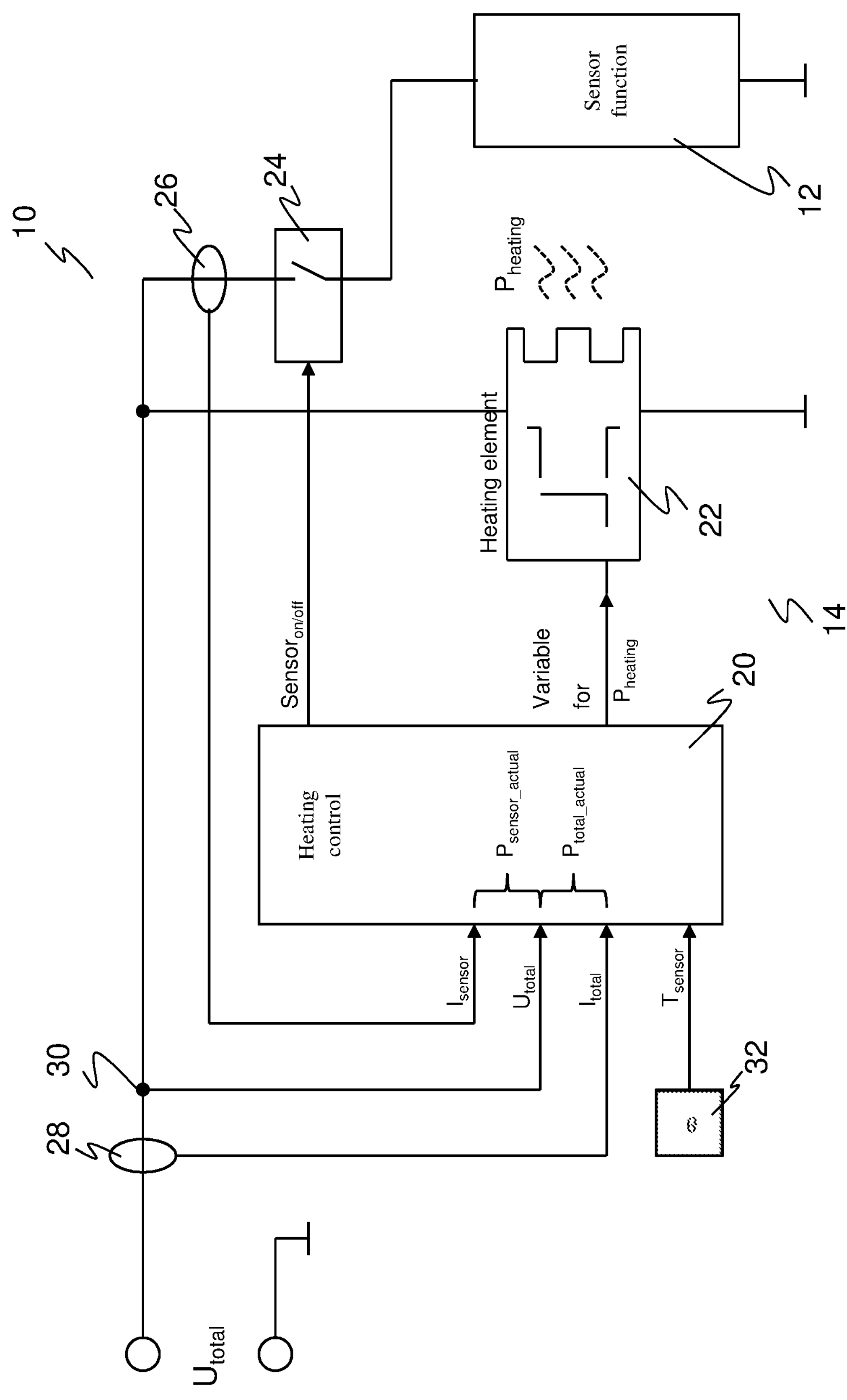
FIG. 3 a block diagram of a heatable sensor with a heating control in accordance with the invention.

FIG. 3 shows a block diagram of the sensor 10 with respect to which the design and function of the heating assembly 14 will be described in more detail. The heating assembly 14 comprises a heating control 20 that is connected to a heating element 22 and a switch 24 for activating and deactivating the sensor functional group 12.

The heating control 20 detects the current $I_{sensor}$ flowing in the sensor functional group 12, the total flowing current $I_{total}$, and the supply voltage $U_{total}$ as the input values. A first current measurement unit 26 and a second current measurement unit 28 as well as a voltage detection 30 are shown for this purpose. It is, however, also conceivable to detect these values in total or in part in another manner, for instance by an initial calibration or parameterization. A conceivable further input value is the temperature $\vartheta$ of an optional temperature probe 32. The heating control 20 derives a required heating power $P_{heating}$ from the input values and controls the heating element 22 accordingly. In addition, the sensor functional group 12 is activated, or not, by a switch 24 in dependence on the operating temperature. The operating temperature can be measured via the temperature probe 32, but can also be estimated independently, for example by the ending of specific heating durations.

The heating control 20 can be implemented as a purely open loop or as a closed loop. For the open-loop case, the heating control 20 preferably knows the transfer function of the heating element 22 to determine a correct variable $P_{heating}$. From a technical circuit aspect, various embodiments of the heating control 20 can be considered, with this depending on demands such as speed, precision, required number of units, costs and available technologies. This ranges from purely analog circuits that determine the calculation operations for determining the required heating power $P_{heating}$ up to a purely digital implementation, for instance on a microprocessor or microcontroller, on an FPGA, an ASIC or mixed forms thereof with corresponding DACs and ADCs therebetween. The heating control 20 is furthermore admittedly clearly separate from the sensor functional group 12 in the Figures and description. It is, however, also possible in a manner deviating therefrom to at least partly combine the heating control 20 with electronics of the sensor functional group 12, whereby construction space and costs can be saved under certain circumstances.

The heating element 22 is preferably one or more electronic components that can be controlled directly or indirectly. They may be, non-exclusively, semiconductors such as transistors or integrated circuits, but also ohmic resistors.

The activation of the sensor functional group 12 takes place in the embodiment in accordance with FIG. 3 via switching in the supply voltage by means of the switch 24, for example a semiconductor switch or a mechanical relay. The voltage supply is alternatively constantly applied to the sensor functional group 12 and is activated in total or in part regions via a control input or via a plurality of control inputs.

The heating control 20 has the aim of keeping the total power consumption of the sensor 10 constant. In simplified terms, exactly so much heat should always be added such as does not anyway arise as waste heat at the sensor functional group 12.

A few basic considerations will now be presented for the understanding of the determination of the starting value $P_{heating}$ of the heating control 20 in dependence on its input values. It first applies $$P_{total}=P_{sensor}+P_{heating}=U_{sensor}*I_{sensor}+U_{heating}*I_{heating}.$$

The voltage in sensor 10 is frequently the same as the supply voltage everywhere. The currents then also add up to the total current, i.e.

$$P_{total}=U_{total}*I_{total}=U_{total}*(I_{sensor}+I_{heating}).$$

$U_{total}$ and $I_{sensor}$ are usually already predefined in practice. The required value of $P_{total}$ can then take place by a corresponding variation of $I_{heating}$, with this naturally also directly changing $I_{total}$. The simplified rule condition is therefore to select the heating current $I_{heating}$ such that it is added to the sensor current $I_{sensor}$ to form a desired total value $I_{total}$. The rule deviation or the error of the input power then moves toward the target value of zero:

$$P_{error}=P_{total\_set}-P_{total\_actual}\rightarrow 0.$$

The sensor current $I_{sensor}$ is measured in the embodiment in accordance with FIG. 3 by the heating control 20 via the first current measurement unit 26. A real time measurement ideally takes place to track any desired changes. Realistically, the measurement cycles must be selected in accordance with the demands, i.e. the degree to which the total power $P_{total}$ may fluctuate, but also the how strong the fluctuations are that are to be expected by influences such as supply voltage fluctuations, element tolerances or operating modes of the sensor 10, that is, for instance, the start-up phase, sensor activity, sensor parameterization, motor revolutions, and the like. The calculation cycles in the heating control 20 naturally also have to be designed in accordance with the demands on the control precision.

Alternatively to a current measurement, a parameterization or a teaching is conceivable, with this, however, assuming a work behavior of the sensor functional group 12 that is at least more or less predictable or requiring that the power consumption of the sensor functional group 12 rather plays a subordinate role. The resulting errors and power peaks that thereby occur can then be tolerated best.

A further alternative does not determine the sensor current $I_{sensor}$ for the total sensor functional group 12, but rather only some of them, preferably for the biggest consumers that can be sensible used as a heating source for heating the sensor 10 or for such elements whose activity is representative for the sensor functional group 12 and can be scaled up. It is conversely also conceivable to balance the heating control 20 itself as a consumer or heat source, i.e. to measure, to teach or to parameterize the current consumed there and to add it to the sensor current $I_{sensor}$.

The simplification $U_{sensor}=U_{heating}=U_{total}$ is mostly sufficient in practice, but is not absolutely necessary. If the assumption is not correct in a specific sensor 10, these values only have to be determined, predefined or estimated, the variable $I_{heating}$ or $P_{heating}$ can then be determined in accordance with the described basic principle. The power is in this process, as generally customary, determined indirectly by ideally simultaneous voltage measurement and current measurement. Alternatives using thermal, photometric or calorific power measurements must only be mentioned for reasons of completeness.

The total heat requirement $P_{total\_AVG}$ of the sensor 10 that is constant and thus always the same as the instantaneous total power $P_{total}$ with an ideal control and that is intended to satisfy the heating control 20 is primarily determined by the environmental conditions, significantly the environmental temperature and air movements, as well as by sensor properties such as housing size, housing material and desired internal temperature. These all play an important role in the thermal design of the sensor 10 during the development phase. To remain flexible in this respect, the heating control 20 can provide the possibility of treating the standard parameter $P_{total\_avg}$ as a variable value. This, for example, allows a flexible adaptation to changed circumstances by parameterization or by cyclic measurement of the environmental temperature conditions.

Figure 4:
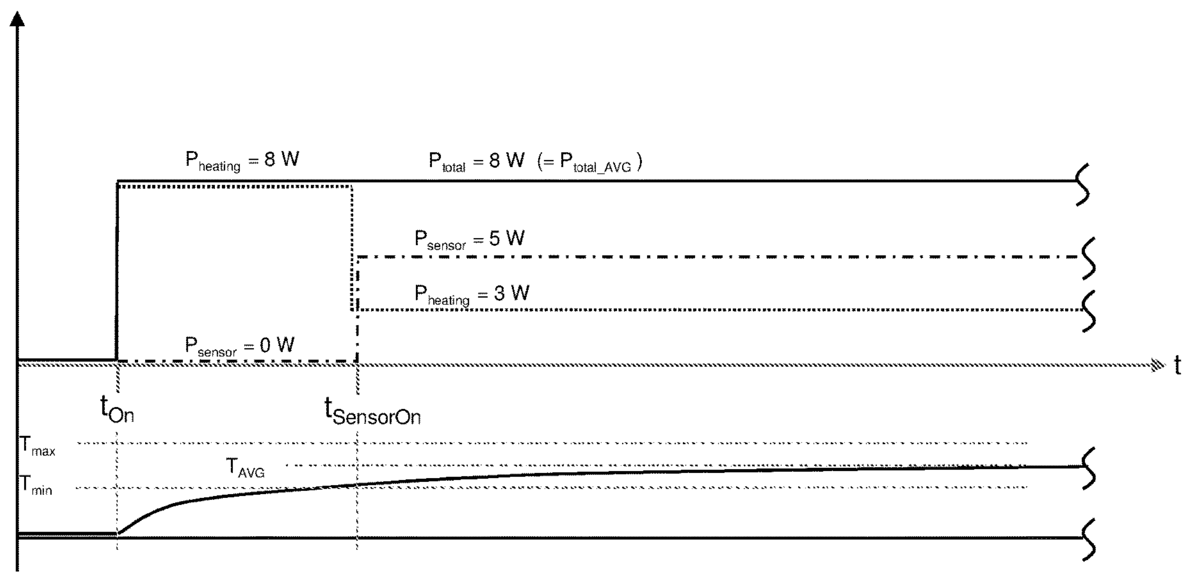
FIG. 4 a time-dependent power observation in an embodiment of the invention assuming a constant power consumption of a sensor functional group.
Figure 5:
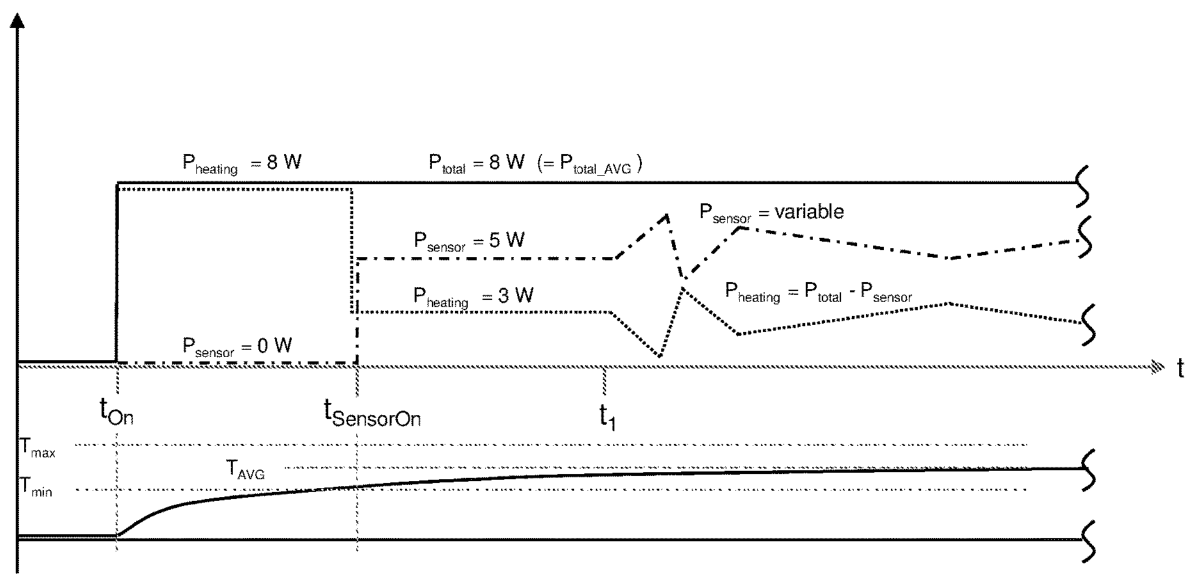
FIG. 5 a time-dependent power observation in a further embodiment in which the actual power consumption of the sensor functional group is measured, with the power consumption of the sensor functional group being subject to fluctuations here.

FIGS. 4 and 5 each show a time-dependent power observation similar to FIG. 2, but now for the case of two embodiments of the heating control 20 in accordance with the invention. In this respect, FIG. 4 corresponds to the case in which the sensor power $P_{sensor}$ is considered as a constant. It then does not even have to be measured. It is an idealization since it only requires unnoticeable fluctuation influences by the operating state, operating mode, supply voltage and the like. Infringements of the assumption that the fluctuation influences can be neglected produce an imprecise temperature that can, however, possibly be tolerated.

As FIG. 4 shows, heating first takes place at full power $P_{heating}$=8 W in this embodiment until a sufficient operating temperature is reached. On activation of the sensor functional group 12 or shortly beforehand, the desired value $P_{heating}$ is reduced by the known constant $P_{sensor}$. In the further development, $P_{heating}$=3 W and $P_{sensor}$=5 W are added to form the total power $P_{total}$=8 W and the goal of $P_{total}=P_{total\_AVG}$ is already reached. The temperature still rises within its tolerance corridor and then stabilizes. There are no temperature fluctuations due to regulation cycles such as in FIG. 2.

FIG. 5 corresponds to the case in which the power consumption of the sensor functional group 12 is measured in real time in an idealized manner. Fluctuations in the power consumptions $P_{sensor}$ that occur in time are detected and are exactly compensated via $P_{heating}$. The development in FIG. 5 is first similar to that in FIG. 4 up to the switching on of the sensor functional group 12 and for a little thereafter. From a point in time $t_1$ selected randomly as an example, however, the power consumption $P_{sensor}$ of the sensor functional group 12 starts to fluctuate greatly. The heating control 20 provides an exactly compensating supplementation of the still missing heating power at any time by an adaptation of $P_{heating}$ to $P_{sensor}$. Externally occurring power peaks are also avoided here despite greatly fluctuating $P_{sensor}$, in this sense there are no corresponding peak values of $P_{total}$ as in FIG. 2, but rather $P_{total}=P_{total\_AVG}$ constantly applies despite the variable $P_{sensor}$. The power supplied for the device heating is correspondingly constant. In another respect, the fluctuations of the sensor power in the situation of FIG. 2 discussed here would even result in peak values $P_{total}$ considerably above 13 W.

The two power curves in accordance with FIGS. 4 and 5 illustrate the extreme cases of a completely constant $P_{sensor}$ or of a fluctuating $P_{sensor}$ measured in real time and error-free. Middle ways of both possibilities are naturally also conceivable, for instance with a slow cyclic measurement and corresponding constant intervals of $P_{heating}$ or with a modeling of a variable $P_{sensor}$.

A comparison of FIGS. 4 and 5 with FIG. 2 underlines the advantages of the invention. Conventionally, a peak power of $P_{total}$=13 W is required even without fluctuations of the power consumption of the sensor functional group 12. The supply, lines and securing have to be correspondingly designed for these peak powers and peak currents. In accordance with the invention, in contrast, the peak value $P_{total}$=8 W is not exceeded and the supply and the elements associated therewith can be selected as correspondingly smaller. Furthermore, the temperature development $T_{int}$ in the device interior is practically no longer subject to any fluctuations in the steady state. The means less thermal stress at the elements and solder points in the device interior.

These advantageous effects can be further amplified if a heat coupler 16 is provided and preferably not only the heating element 22, but also the relative components of the sensor functional group 12 that generate power loss couple as well as possible thermally. The heat coupler 16 picks up the heat from the heat sources and distributes it to the critical points in the sensor 10. A large-area geometry of the heat coupler 16 can simultaneously serve for the temperature homogenization of the temperature $T_{int}$ in the device interior.

Figure 6:
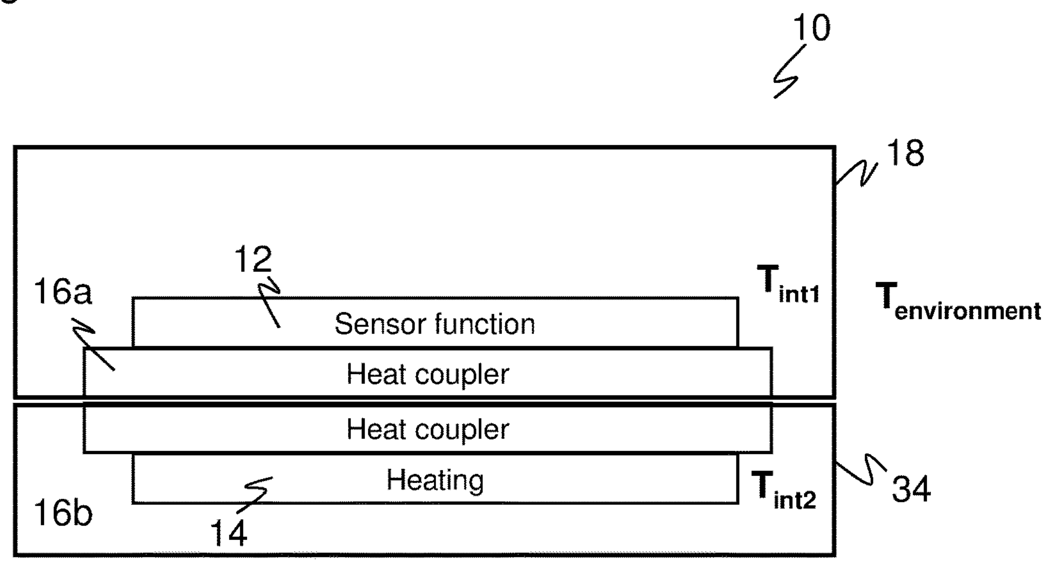
FIG. 6 a block diagram of an embodiment of a heatable sensor with a heating module coupled to the outside.
Figure 7:
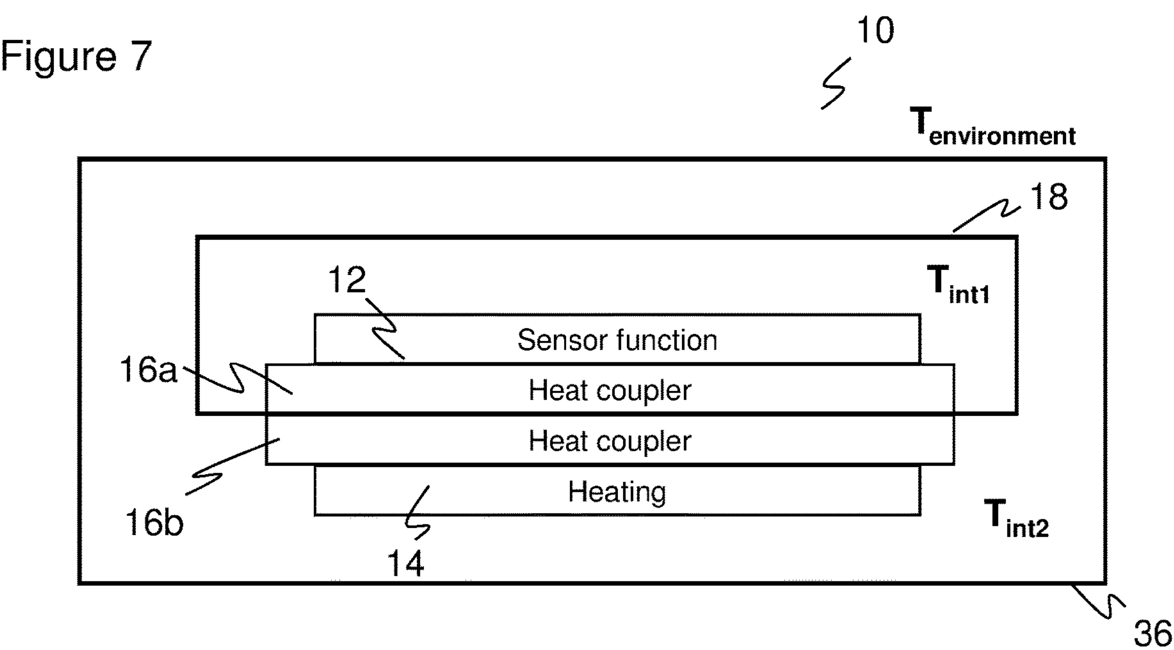
FIG. 7 a block diagram of an embodiment of a heatable sensor with an inwardly disposed module.

FIGS. 6 and 7 finally show two mechanical embodiments of the sensor 10 as alternatives to the basic structure of FIG. 1.

In the embodiment in accordance with FIG. 6, the heating assembly 14 is not accommodated in the actual housing 18 of the sensor 10, but a separate heating module having its own housing 34 is rather provided. The two housings 18, 34 contact one another over a large area at least one side and the thermal connection is even further assisted by heat couplers 16*a-b* at both sides.

In the embodiment in accordance with FIG. 7, the heating unit envelops the housing 18 of the sensor 10 with its own housing 36 and surrounds it completely ("housing-in-housing"). The demands on the heat coupling can in this respect possibly be a little less strict. Both heat couplers 16-*b* are nevertheless preferably also provided at both sides here.

The modularity in both variants in accordance with FIGS. 6 and 7 provide more flexibility as well as possibilities for expansion, retrofitting and combination. The principle with the heating control 20 explained with reference to FIG. 3 can be maintained. To still allow a current measurement and possibly also a voltage measurement of the sensor functional group 12, the electrical sensor connector can be looped over the heating module.

The invention claimed is:

1. A sensor comprising:

at least one sensor functional group, a heating device, and a heating control to control a heating power of the heating device, wherein the heating control being configured to adapt the heating power to a power consumption of the sensor functional group, wherein the heating control is configured to keep the sum of heating power and power consumption constant, wherein the heating control is configured to keep the sum of heating power and power consumption constant established by the sensor current forming a desired total current to generate the total power, with the total power established by a sensed deviation from a desired operating temperature.

2. The sensor in accordance with claim 1, wherein the sensor is an optoelectronic sensor.

3. The sensor in accordance with claim 1, wherein the sensor functional group has at least one of the following components: a transmitter, a receiver, an analog circuit, a digital module, a motor.

4. The sensor in accordance with claim 1, wherein the heating device has a controllable electronic component as the heating element.

5. The sensor in accordance with claim 1, wherein the heating control is configured to heat at a high heating power in a starting phase and only then to switch the sensor functional group active.

6. The sensor in accordance with claim 1, wherein the heating control is configured to parameterize or teach the power consumption.

7. The sensor in accordance with claim 1, wherein the heating control is configured to measure the power consumption.

8. The sensor in accordance with claim 7, wherein the heating device has a current measurement unit for the current flowing in the sensor functional group in order thus to determine the power consumption.

9. The sensor in accordance with claim 1, wherein the heating control is configured to determine the power consumption only for some of the sensor functional group.

10. The sensor in accordance with claim 1, that has a temperature probe connected to the heating device.

11. The sensor in accordance with claim 1, wherein the heating device is accommodated in its own housing that is coupled to a housing of the sensor functional group.

12. The sensor in accordance with claim 1, wherein the heating device is accommodated in a housing that surrounds a housing of the sensor functional group.

13. The sensor in accordance with claim 1, that has at least one heat coupling element for conducting heat of the heating device and/or from thermally active sensor components to critical points of the sensor functional group.

14. A method of heating a sensor, the method comprising the steps of:

heating at least one sensor functional group of the sensor by a heating device, controlling a heating power of the heating device by heating the at least one sensor functional group of the sensor to keep the sum of heating power and power consumption constant, and adapting the heating power to a power consumption of the sensor functional group, wherein the heating control is configured to keep the sum of heating power and power consumption constant established by the sensor current forming a desired total current to generate the total power, with the total power established by a sensed deviation from a desired operating temperature.

15. The method in accordance with claim 14, wherein the sensor is an optoelectronic sensor.

16. The method in accordance with claim 14, further comprising the step of:

keeping the sum of heating power and power consumption constant.

17. The method in accordance with claim 14, further comprising:

controlling the heating power of the heating device by selecting heating current $I_{heating}$ by adding the heating current to sensor current $I_{sensor}$ to form a desired total value $I_{total}$, by establishing a rule deviation or error correction, wherein the input power then moves toward a target value of zero.

* * * * *